United States Patent [19]
Murakami

[11] Patent Number: 5,175,747
[45] Date of Patent: Dec. 29, 1992

[54] EQUALIZER

[75] Inventor: Keishi Murakami, Kanagawa, Japan

[73] Assignee: Mitsubishi Denki Kabushiki Kaisha, Japan

[21] Appl. No.: 730,675

[22] Filed: Jul. 16, 1991

Related U.S. Application Data

[63] Continuation-in-part of Ser. No. 604,940, Oct. 29, 1990, Pat. No. 5,068,873.

[51] Int. Cl.[5] .................................... H03H 21/00
[52] U.S. Cl. .................................. 375/14; 333/18
[58] Field of Search ............... 333/18; 364/724.2; 375/12, 14

[56] References Cited

U.S. PATENT DOCUMENTS

| | | | |
|---|---|---|---|
| 3,648,171 | 3/1972 | Hirsch | 375/14 |
| 3,715,670 | 2/1973 | Hirsch et al. | 375/14 |
| 4,567,599 | 1/1986 | Mizoguchi | 333/18 X |
| 4,811,360 | 3/1989 | Potter | 333/18 X |
| 4,890,298 | 12/1989 | Galpin | 375/14 |
| 4,985,902 | 1/1991 | Gurcan | 333/18 X |
| 5,050,186 | 9/1991 | Gurcan et al. | 333/18 X |

FOREIGN PATENT DOCUMENTS

| | | |
|---|---|---|
| 57-32768 | 9/1983 | Japan . |
| 150335 | 9/1983 | Japan . |

OTHER PUBLICATIONS

39th IEEE Vehicular Technology Conference vol. 1, May 1989.
Eurocon 88 8th European Conference on Electrotechnics Conference Proceedings on Area Communication.
M. S. Mueller, "Least-Squares Algorithms for Adaptive Equalizers," The Bell System Technical Journal, Oct. 1981, pp. 1905-1925.
Mitsutoshi Hatori, "Latest Aspect of Adaptive Filters," Measurement and Control Journal, vol. 25, No. 12, 1986, pp. 1082-1088.

Primary Examiner—Paul Gensler
Attorney, Agent, or Firm—Wolf, Greenfield & Sacks

[57] ABSTRACT

An adaptive equalizer comprising a computing unit which receives a known signal sequence to estimate transmission channel characteristics and effect compensatory control of tap coefficients by use of a first algorithm that has fast convergence property, and a tap coefficient computing unit for making compensation for relatively slow changes in a random data input after the compensation for the transmission channel characteristics, which either employs an algorithm that involves a relatively low computational complexity or intermittently executes computation which contains an interpolation of consecutive sets of tap coefficients between intermittent intervals.

6 Claims, 8 Drawing Sheets

EQUALIZER

RELATED APPLICATIONS

The present application is a continuation-in-part of U.S. application Ser. No. 604,940, filed Oct. 29, 1990, now U.S. Pat. No. 5,068,873, entitled "Equalizer", issued on Nov. 26, 1991.

BACKGROUND OF THE INVENTION

The present invention relates to an equalizer which is provided in a receiver that is used for digital radio communication, digital mobile radio communication, etc.

FIG. 5 shows one example of the arrangement of conventional equalizers, disclosed, for example, in "Instrumentation and Control" Vol. 25, No. 12 (December 1986), pp. 22-28.

In the figure: reference numeral 1 denotes a received signal input terminal; 10 to 13 delay elements each of which delays by a time T a signal that is inputted through the terminal 1; 20 to 23 weight circuits which multiply the input signal and the signals delayed through the delay elements 10 to 13 by weights (hereinafter referred to as "tap coefficients") $a_0$ (n) to $a_N$ (n), respectively, and output the results; 30 an adder which adds together the outputs of the weight circuits 20 to 23 and outputs the result; 40 an output terminal from which is outputted the result of the addition in the adder 30; 50 a reference signal input terminal from which is inputted a reference signal d(n), which is a known signal sequence; 31 an adder which obtains a difference between the reference signal, i.e., known signal sequence; that is inputted through the terminal 50 and the output from the adder 30; and 60 an error signal output terminal from which is delivered the output of the adder 31 as being an error signal $\epsilon(n)$. A section in this arrangement which comprises the delay elements 10 to 13, the weight circuits 20 to 23 and the adder 30 is referred to as an equalizing circuit 80.

Examples of equalizer structures include, in addition to the feed-forward type equalizer shown in FIG. 5, a feedback type equalizer shown in FIG. 6, a decision feedback type equalizer shown in FIG. 7, and a decision feedback type equalizer that is a combination of the two equalizer structures, shown in FIGS. 5 and 7, i.e., that uses both a feed-forward section and a feedback section. In FIGS. 6 and 7, the same reference numerals as those shown in FIG. 5 denote the same elements or portions.

Reference numeral 70 in FIG. 7 denotes a decision element, which, in the case of binary decision, decides between binary data, that is, +1 and −1, by judging to which one of the binary data (+1 and −1) the output of the adder 30 is closer. The decision element 70 defines the result of the decision as an output signal y(n) and also as an input signal to the delay element 10 in the feedback section.

The feedback type equalizer that is shown in FIG. 6 does not employ a decision element, such as that employed in the arrangement shown in FIG. 7, but uses the output of the adder 30 as an input signal to the delay element 10 in the feedback section without making a decision.

FIG. 8 shows the arrangement of packet data that comprises a known signal sequence and a random data sequence for estimation of transmission channel characteristics.

The operation will next be explained.

In an equalizer that has an arrangement such as that shown in FIG. 5, a received signal x(n) (n is a parameter representative of discrete time t=n) that is inputted to the input terminal 1 is divided into two, one of which is inputted to the delay element 10, and the other of which is inputted to the weight circuit 20 that has a tap coefficient $a_0$ (n), where it is weighted and then outputted. Similarly, the output of the delay element 10 is defined as a received signal x(n−1) at t=(n−1), which is then divided into two, one of which is inputted to the delay element 11, and the other of which is inputted to the weight circuit 21 that has a tap coefficient $a_1$ (n), where it is weighted and then outputted. If this operation is carried out with respect to all of N delay elements and N+1 weight circuits, the output y(n) of the adder 30 at the time n is given by $$y(n) = \sum_{i=0}^{N} a_i(n)x(n - i) \quad (1)$$

This is a linear time-varying filter, and the z-transform of the transfer function of this time-varying filter is given by $$a(z,n) = \sum_{i=0}^{N} a_i(n)z^{-i} \quad (2)$$

Incidentally, in the case of an unknown transmission channel whose characteristics vary continuously, for example, a fading channel, it is necessary in order to obtain excellent transmission quality to continuously compensate for the distortion caused by the fading by introducing an equalizer. That is, the tap coefficient $a_i$ (n) (i=0, 1, ..., N) shown in Expressions (1) and (2), which is a function of the parameter n that represents time, must be adaptively controlled so as to optimally compensate for the distorted channel, for each time.

A typical example of this adaptive control employs a reference signal d(n), that is a known signal sequence, which is inputted through the reference signal input terminal 50 in the arrangement shown in FIG. 5. This reference signal is a known signal sequence that is sent in advance of data, as shown in FIG. 8. While this known signal sequence is being sent, the characteristics of the transmission channel are estimated and the tap coefficients are decided to realize ideal transmission characteristics. In general, the error signal $\epsilon(n)$, which is given by the difference between the reference signal d(n) and the output signal y(n), is defined by $$\epsilon(n) = d(n) - y(n) \quad (3)$$

By using the error signal $\epsilon(n)$, the tap coefficients are adaptively controlled so that an error is minimized.

Various algorithms, such as those mentioned below, may be used for adaptive control of the tap coefficients according to various purposes. For example, the LMS (Least Mean Square) algorithm is expressed as follows:

$$a(n+1) = a(n) + \mu\epsilon(n)x(n) \quad (4)$$

where $\mu$ is a parameter which is known as step-size parameter, and $\epsilon(n)$ is an error value that is given by Expression (3).

The Kalman filter algorithm is expressed as follows:

$$a(n+1) = a(n)\left(\sum_{i=0}^{n} x(i)x^T(i)\right)^{-1} \epsilon(n)x(n) \quad (5)$$

where the superscript T denotes transposition of the matrix.

With an adaptive control algorithm such as those described above, the transmission channel characteristics are estimated and the tap coefficients are determined.

After the transmission channel characteristics are estimated and the tap coefficients are compensatively controlled on the basis of the reference signal, which is a known signal sequence, a random data sequence that is sent after the known signal sequence, as shown in FIG. 8, is subjected to equalization. To effect the equalization, the following two methods may be employed: a first equalization method wherein the tap coefficients of the equalizer that are determined by the reference signal, which is a known signal sequence, are fixed and not updated and, in this state, equalization of the random data section is effected; and another equalization method wherein the output signal y(n) for the random data section is decided by using as initial values the tap coefficients which have been determined by the received signal corresponds to a known signal sequence, and with the result of the decision being regarded as a reference signal d(n), the equalization of the random data section is adaptively effected. With these methods, the equalization of the random data section is conducted.

The conventional equalizers that are arranged as described above involve various problems described below. For example, when the change of transmission channel characteristics is rapid, an equalizer, which estimates the transmission channel characteristics only on the basis of a known signal sequence and effects equalization of the data section with the tap coefficients being fixed, becomes unable to track the rapid change of the characteristics as the equalization progresses toward the trailing end of the data section, resulting in a performance degradation of the received signal. In an equalizer which adaptively equalizes the data section by using as initial values tap coefficients that are set on the basis of a known signal sequence, the amount of computational complexity that is required to update the tap coefficients becomes enormous, which limits the rate at which data can actually be transmitted.

SUMMARY OF THE INVENTION

In view of the above-described problems of the prior art, it is an object of the present invention to provide an equalizer which is capable of tracking rapid changes in the characteristics of the transmission channel without limiting the data transmission rate and capable of supplying good data quality.

It is another object of the present invention to provide an equalizer which is capable of adaptively equalizing the data section by using as initial values tap coefficients that are obtained by use of a known signal sequence, without a large increase in the amount of computational complexity and a limit in the data transmission rate.

A first feature of the equalizer according to the present invention resides in that the equalizer comprises a first computing section in which transmission channel characteristics are estimated and tap coefficients are set on the basis of a known signal sequence and in accordance with a first algorithm, with which tap coefficients converge quickly, and a second computing section in which tap coefficients are set in accordance with a second algorithm, which involves a relatively low computational complexity, on the basis of a signal that has been equalized and decided by using as initial values the tap coefficients set in the first computing section, thus updating the tap coefficients by the two computing sections having different algorithms.

With the above-described arrangement, the equalizer of the present invention is capable of tracking changes in the characteristics of the transmission channel and it is also possible to reduce the amount of computational complexity required and eliminate the limitation on the data transmission rate. Thus, the equalizer of the present invention is capable of coping with high-speed data transmission.

A second feature of the equalizer according to the present invention resides in that updating of the tap coefficients is executed by use of at least two different kinds of tap-coefficient-update algorithms, one of which executes computation for every symbol, and the other of which executes computation by an intermittent operation with a relatively long period, i.e., at a relatively low frequency.

In the present invention, at least two different kinds of tap-coefficient-update algorithms are employed. That is, at least one is a fast converging algorithm by which tap-coefficients are determined by making an estimation of the characteristics of the transmission channel by use of a known signal sequence, resulting in initial tap coefficients, and in regard to the data section, the other is an algorithm which updates the set tap coefficients once per every several symbols, thereby enabling the tap coefficients to track relatively slow changes in the characteristics of the transmission channel.

DETAILED DESCRIPTION OF THE PREFERRED EMBODIMENTS

Embodiments of the present invention will be described below with reference to the accompanying drawings.

Figure 1:
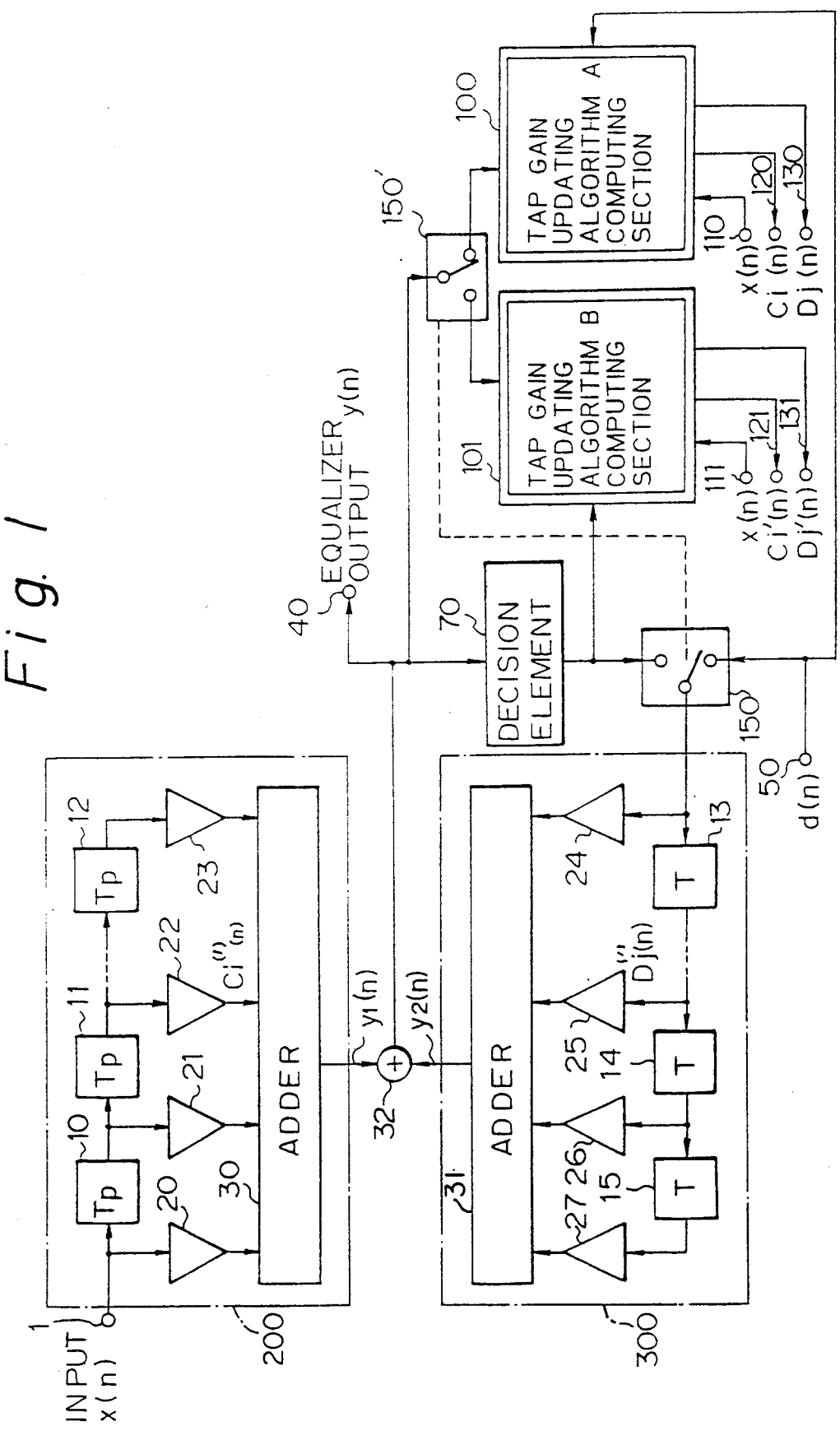
FIG. 1 is a block diagram of a first embodiment of the equalizer according to the present invention.
Figure 5:
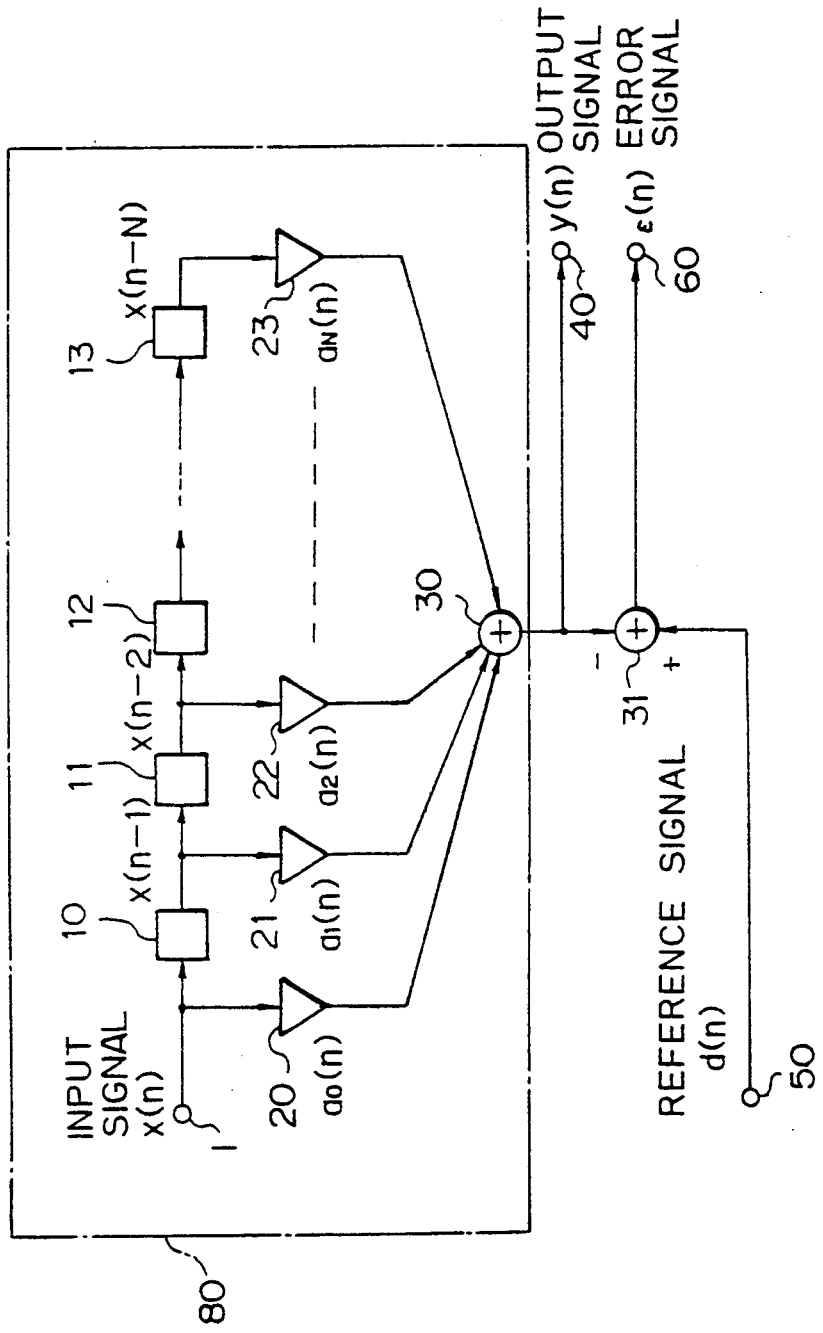
FIG. 5 is a block diagram of a conventional feed-forward type equalizer.
Figure 6:
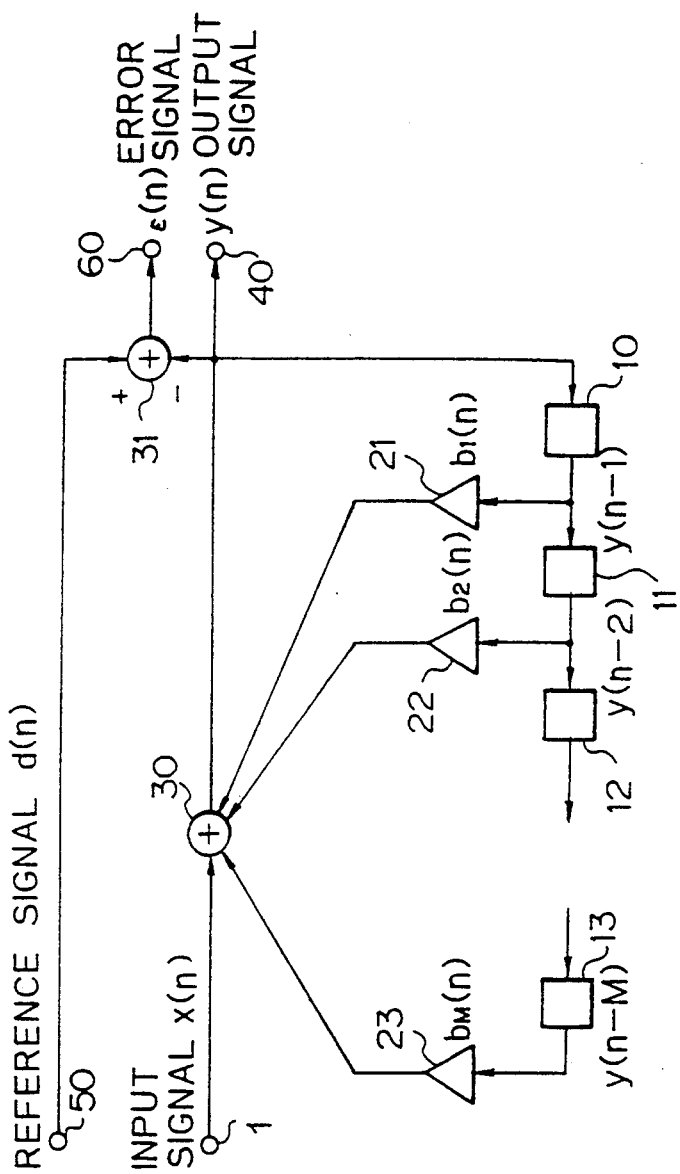
FIG. 6 is a block diagram of a conventional feedback type equalizer.
Figure 7:
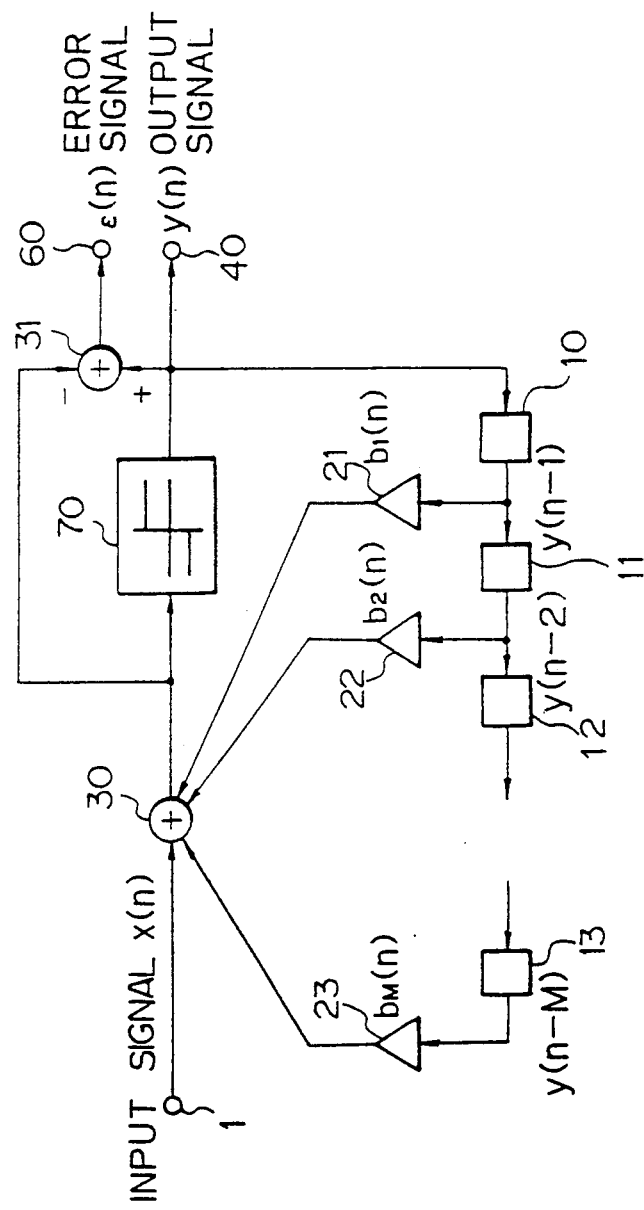
FIG. 7 is a block diagram of a conventional decision feedback type equalizer.
Figure 8:
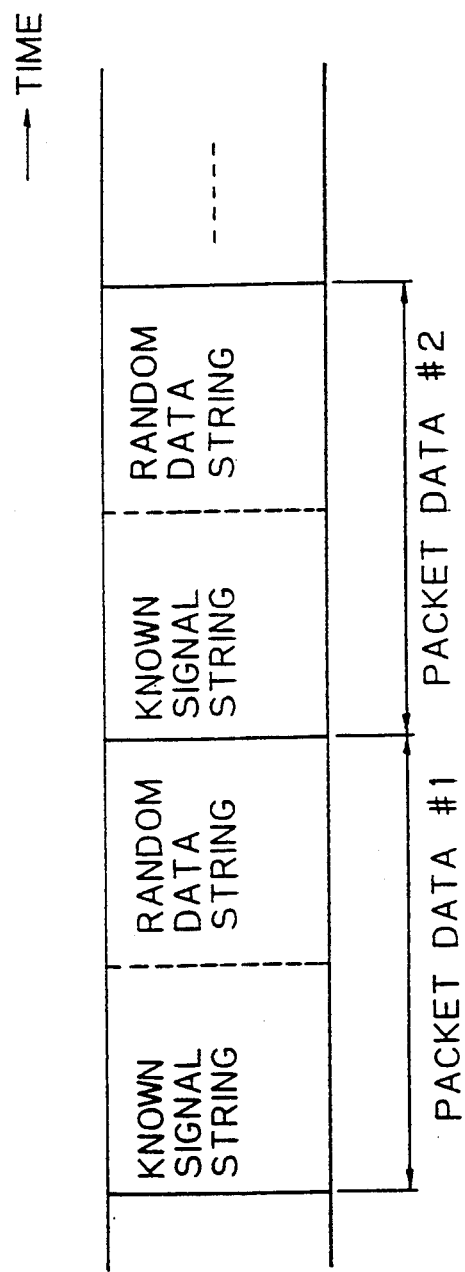
FIG. 8 shows one example of the arrangement of packet data.

FIG. 1 shows the arrangement of a first embodiment of the equalizer according to the present invention. In the figure, reference numeral 1 denotes a received signal input terminal, 10 to 15 delay elements, 20 to 27 weight circuits, 30 to 32 adders, 40 an output terminal, and 70 a decision element. Description of those portions of this arrangement which are the same as the corresponding portions shown in FIG. 5 is omitted. Reference numerals 100 and 101 denote computing sections. The computing section 100 computes tap coefficients $C_i(n)$ (120) ($i=0, 1, \ldots, N1$) which are to be outputted to a feed-forward section 200 and tap coefficients $D_j(n)$ (130) ($j=0, 1, \ldots, N2$) which are to be outputted to a feedback section 300, on the basis of an input signal $x(n)$ (110) which is the same as the received signal that is inputted to the input terminal 1 and in accordance with a predetermined tap-coefficient-update algorithm. Similarly, the computing section 101 computes tap coefficients $C_i'(n)$ (121) which are to be outputted to the feed-forward section 200 and tap coefficients $D_j'(n)$ (131) which are to be outputted to the feedback section 300, on the basis of an input signal $x(n)$ (111) which is the same as the received signal that is inputted to the input terminal 1 and in accordance with another predetermined tap-coefficient-update algorithm. $N1+1$ represents the number of taps in the feed-forward section 200, and $N2+1$ represents the number of taps in the feedback section 300. A switch 150 selects either an output signal from the decision element 70 or a reference signal $d(n)$, as being an input to the feedback section 300. A switch 150', which interlocks with the switch 150, inputs an equalizer output signal to the computing sections 100 and 101 selectively. The feed-forward section 200 and the feedback section 300, which are the same as the equalizer circuits that are shown in FIGS. 5 and 7, are combined together to form a decision feedback type equalizer.

The operation will next be explained.

First, a received signal $x(n)$ that is inputted to the input terminal 1 is filtered through the feed-forward section 200 and outputted from the adder 30, as shown in Expression (1). That is, the output of the adder 30 is given by $$y(n) = \sum_{i=0}^{N1} C_i(n)x(n - i) \qquad (6)$$

The delay elements 10 to 12 have a delay quantity Tp which is expressed as $T/Tp = p$ (an integer), where T is one symbol period. When $p=1$, the system is equivalent to that of the prior art shown in FIG. 5. On the other hand, the decision element 70 makes a decision about an equalizer output that is delivered to the output terminal 40 and outputs the result of the decision, in the same way as in the prior art shown in FIG. 7.

When the estimation of the transmission channel characteristics is to be made by use of a reference signal, which is a known signal sequence, to set tap coefficients, the switch 150 allows a reference signal, which is a known signal sequence, to be inputted to the feedback section 300, and the switch 150' connects the equalizer output signal to tap-coefficient update algorithm (A) computing section 100. When an equalization of a random data sequence is to be executed, the switch 150 operates so that the result of the decision made in the decision element 70 is inputted to the feedback section 300. The switch 150' operates in interlocking relation to the switch 150 connecting the equalizer output signal to tap-coefficient-update algorithm (B) computing section 101.

Figure 2:
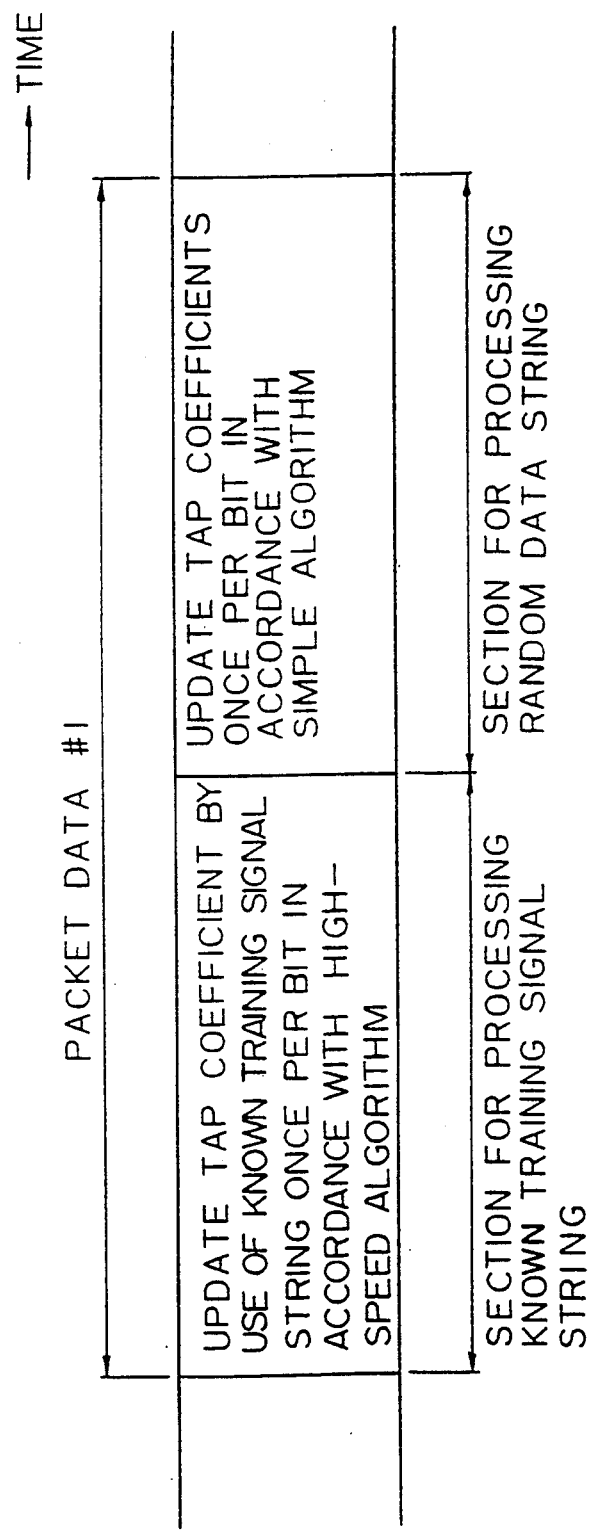
FIG. 2 is a timing chart showing the operation of the first embodiment of the present invention.

The equalizer of the present invention incorporates two computing sections 100 and 101 which respectively execute two different kinds of tap-coefficient-update algorithms. Thus, packet data is processed by the two tap-coefficient-update algorithm computing sections which have algorithms corresponding to two different signal sequence of the packet data, as shown in FIG. 2. First, the tap-coefficient-update algorithm (A) computing section 100 estimates the transmission channel characteristics for each symbol in the known signal sequence by use, for example, of the adaptive control algorithm of Kalman filter, described in connection with the prior art, which is an algorithm that has a fast convergence property at the cost of increased computational complexity, thereby determining the tap coefficients $C_i(1)$ (120) for the feed-forward section and the tap coefficients $D_j(1)$ (130) for the feedback section at the time $t=1$ at which the known signal sequence is terminated, as follows:

$C_i(1) = \{C_0(1), \ldots, C_{N1}(1)\}$ $D_j(1) = \{D_0(1), \ldots, D_{N2}(1)\}$ By use of the above-described algorithm, the transmission channel characteristics can be estimated on the basis of a short known signal sequence and it is therefore possible to improve the data transmission efficiency.

Next, equalization of the random data section is effected by using as initial values the feed-forward section tap coefficients $C_i(1)$ (120) and the feedback section tap coefficients $D_j(1)$ (130), which have been set in the tap-coefficient-update algorithm (A) computing section 100. At this point of time, the compensation of the tap coefficients for the transmission channel characteristics has almost been completed, and the tap-coefficient-update algorithm (B) computing section 101 therefore needs to compensate for only relatively slow changes of the channel characteristics, such as Doppler frequency. More specifically, the computing section 101 is only required to effect compensation by use of an algorithm which necessitates a relatively low computational complexity at the cost of slow convergence property, for example, a gradient algorithm, as a data section equalizing algorithm, thereby determining $C_i'(1)$, which are the tap coefficients (121) for the feed-forward section, and $D_j'(1)$, which are the tap coefficients (131) for the feedback section. Thus, the required computation period for updating tap coefficients does not constitute a factor that determines the upper limit of the data transmission rate, and the equalizer is capable of tracking relatively slow changes in the transmission channel characteristics.

As has been described above, the estimation of the transmission channel characteristics and the updating of the tap coefficients to equalize the received signal are executed by two computing sections based on two different kinds of algorithm.

Although in this embodiment a value, which is computed from the equalizer output value and a resulting decision value thereof in the tap-coefficient-update algorithm computing section 101, is employed as an error signal that corresponds to Expression (3), it is also possible to employ a value that is computed in the decision element 70 shown in FIG. 1 on the basis of values which are inputted to and outputted from it.

Although in this embodiment the Kalman filter algorithm and the gradient algorithm are employed as two different kinds of tap-coefficient-update algorithms, it should be noted that the present invention is not necessarily limited to the mentioned algorithms and that other algorithms may also be employed, provided that employed algorithms satisfy the required characteristics regarding the respective processings.

Although in this embodiment two tap-coefficient-update algorithm computing sections are disposed in parallel to take charge of updating tap coefficients, respectively, the arrangement may also be such that a DSP (Digital Signal Processor), for example, is employed to constitute a tap-coefficient-update computing section and software is changed in accordance with two different kinds of tap-coefficient-update algorithm in the same hardware. With this alternative arrangement, the same advantageous effects are obtained.

Although in the foregoing embodiment the present invention has been described with respect to a decision feedback type equalizer that incorporates both a feed-forward section and a feedback section, the equalizer may comprise either a feed-forward section or a feedback section only.

Although an arrangement that is modeled on the baseband transmission system is shown in the foregoing embodiment, for a modulation system such as an orthogonal modulation system, the described arrangement may be expanded on the basis of a two-dimensional baseband model that comprises two components, i.e., in-phase and quadrature components, to arrange an equalizer by taking into account the interference between the in-phase and quadrature components. This alternative arrangement also provides advantageous effects which are similar to those provided by the described embodiment.

Thus, the first embodiment of the present invention comprises the first computing section in which the transmission channel characteristics are estimated and tap coefficients are set on the basis of a known signal sequence and in accordance with the first algorithm, which has a fast convergence property, and the second computing section in which tap coefficients are determined in accordance with the second algorithm, which involves a relatively low computational complexity, by use of an output signal from a decision element that is obtained on the basis of the tap coefficients set in the first computing section, thus updating the tap coefficients by the two computing sections having different algorithms. It is therefore possible to track changes in the characteristics of the transmission channel and also possible to reduce the computational complexity required and eliminate the limitation on the data transmission rate. Thus, the equalizer of the present invention is capable of coping with high-speed data transmission.

Figure 3:
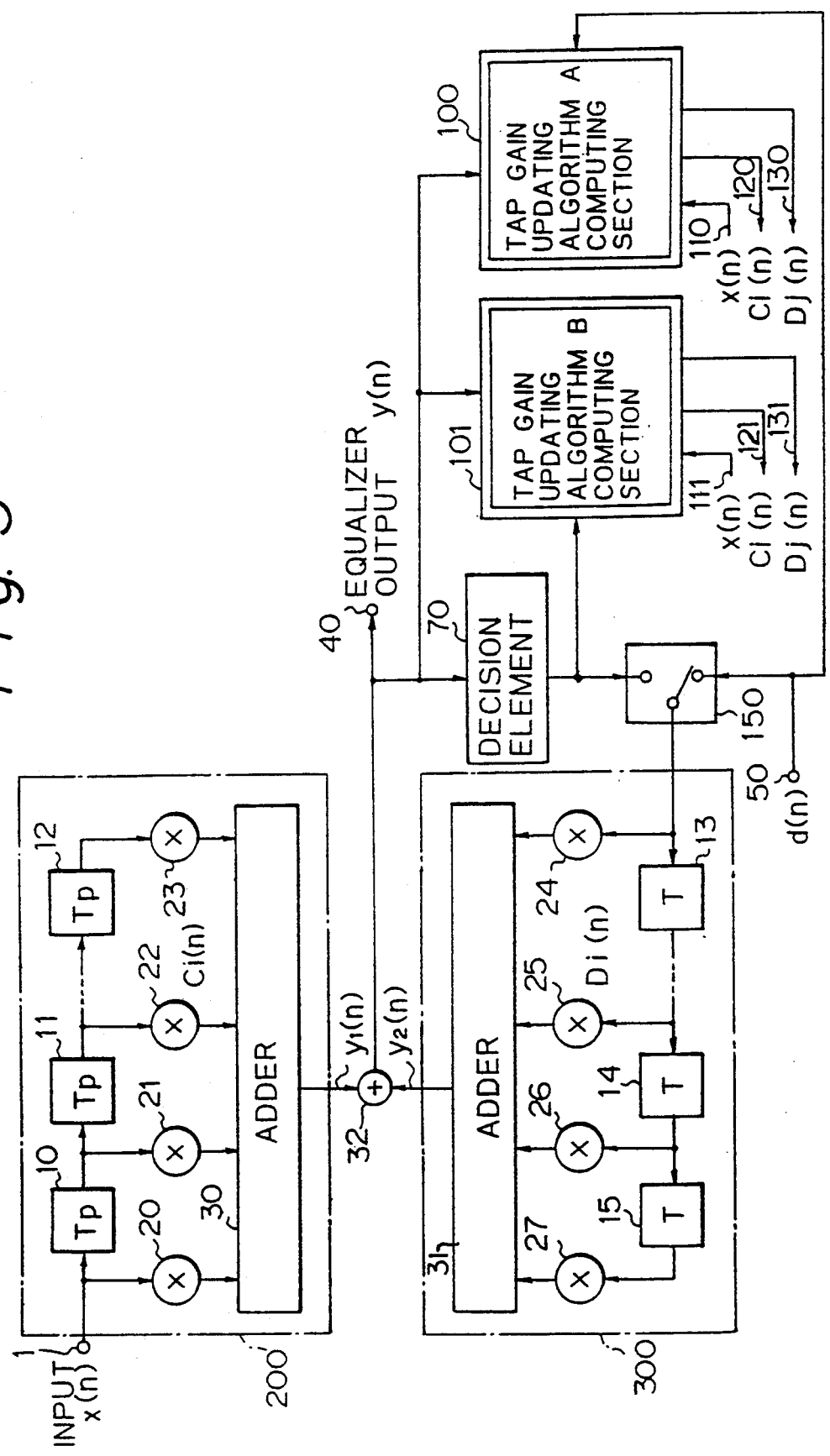
FIG. 3 is a block diagram of a second embodiment of the equalizer according to the present invention.

FIG. 3 is a block diagram showing the arrangement of a second embodiment of the equalizer according to the present invention. In the figure, the same reference numerals as those shown in FIG. 1 denote the same or corresponding elements or portions. That is, reference numerals 10 to 15 denote delay elements, 20 to 27 weight circuits, 30 to 32 adders, and 70 a decision element. Computing sections 100 to 101 compute tap coefficients $C_i(n)$ and $D_i(n)$ in accordance with predetermined tap-coefficient-update algorithms from an equalizer output that is outputted to an output terminal 40 and input signals x(n), denoted by 110 and 111, which are the same as a received signal that is inputted to an input terminal 1. A switch 150 selects either an output signal from the decision element 70 or a reference signal d(n), as being an input to a feedback section 300. A feed-forward section 200 and the feedback section 300, which are the same as the equalizer circuits shown in FIGS. 5 and 7, comprise in combination a decision feedback type equalizer.

The operation of the second embodiment will next be explained. However, the portion of the operation that is the same as that of the first embodiment is omitted and only a portion which features the second embodiment will be explained.

In the equalizer of this embodiment, the switch 150' that is employed in the first embodiment is eliminated, and adaptive equalization is realized by estimating the transmission channel characteristics and then executing an intermittent tap-coefficient-update algorithm as described below.

Referring to FIG. 3, when a known signal sequence is employed as an input signal to the feedback section 300, the switch 150 selects a known signal sequence that is inputted through the reference signal input terminal 50, whereas, when equalization of the data section is to be executed, the switch 150 selects the output of the decision element 70.

In this embodiment also, the equalizer incorporates two algorithm computing sections 100 and 101 having two different kinds of tap-coefficient-update algorithms. It is assumed that the estimation of the transmission channel characteristics is made for each symbol in the known signal sequence in the tap-coefficient-update algorithm (A) computing section 100 and tap coefficients at the time T=1 at which the known signal sequence is terminated are determined to be $C(l) = \{C_0(l), C_1(l), \ldots, C_{N1}(l)\}$ and $D(l) = \{D_0(l), D_1(l), \ldots, D_{N2}(l)\}$. N1+1 represents the number of taps in the feed-forward section 200, and N2+1 represents the number of taps in the feedback section 300.

Next, in the tap-coefficient-update algorithm (B) computing section 101, the data section is equalized by using the tap coefficients C(l) and D(l) as initial values. At this point of time, the compensation of the tap coefficients for the transmission channel characteristics has almost been completed, and the tap-coefficient-update algorithm (B) computing section 101 therefore needs to compensate for only relatively slow changes of the channel characteristics, such as Doppler frequency. Accordingly, it is only necessary to estimate the rate of the change and update the tap coefficients intermittently. More specifically, assuming that updating of the tap coefficients is executed once every 5 symbols, for example, the updating is effected by use of symbols in the data section whose ordinal numbers are multiples of 5, i.e., the 5th symbol, the 10th symbol, the 15th symbol ... in the data section. In other words, since the transmission channel has no rapid change in 2 to 4 symbols, it is possible to satisfactorily track slow changes in the transmission channel characteristics even by such an intermittent operation.

Figure 4:
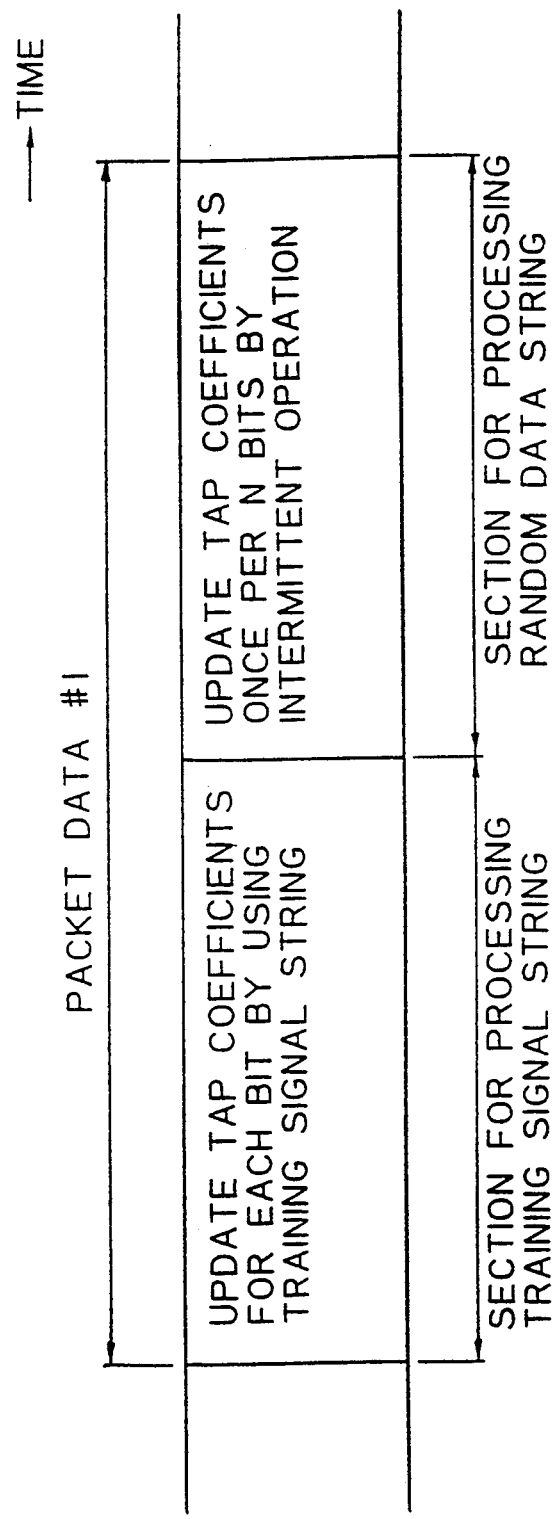
FIG. 4 is a timing chart showing the operation of the second embodiment of the present invention.

FIG. 4 shows one example of the processing of packet data in this operation.

Incidentally, an algorithm that has a fast convergence property is required to update the tap coefficients since it is necessary to increase the data transmission efficiency by using a short known signal sequence for the estimation of the transmission channel characteristics. The Kalman filter algorithm that is mentioned in connection with the prior art is a typical example of such an algorithm. It is well known that the convergence of the Kalman filter algorithm is extremely fast, but the computational complexity required for this algorithm is enormous. However, if this algorithm is employed only for the short known signal sequence to effect the estimation for each symbol and an intermittent operation which is performed once every n symbols is employed for the data section, then the computational complexity required for each symbol is 1/n. Accordingly, the computational complexity required for the tap-coefficient-update algorithms has no significant effect on the data transmission rate.

In this embodiment also, the modifications that are mentioned at the end of the description of the first embodiment are applicable. Although in this embodiment the Kalman filter algorithm is employed, algorithms which are usable in the present invention are not necessarily limitative thereto. For example, adaptive algorithms such as the LMS algorithm and the learning identification algorithm may also be employed.

Although in this embodiment two tap-coefficient-update algorithm computing sections are employed, the number of computing sections used is not necessarily limitative thereto. It is also possible to employ three or more computing sections; in such a case, one of them is appropriately selected.

Thus, according to the second embodiment of the present invention, the equalizer is provided with a plurality of computing sections having different computing periods for computing respective tap-coefficient-update algorithms. It is therefore possible to track changes in the characteristics of the transmission channel and also possible to reduce the computational complexity required and cope with high-speed data transmission.

Although in the foregoing embodiment the random data section is equalized without updating the tap coefficients when no intermittent algorithm operation is being executed, in the instance, for example, wherein a fixed frequency deviation is present, the equalization ability of the equalizer may be increased by determining the tap coefficients between the intermittent operations. Such determination of the tap coefficients may be achieved by, for example, using first order interpolation techniques from the tap coefficients generated by the intermittent operations.

That is, if the tap coefficients at the times $t = \tau$ and $t = \tau + n$ are determined as $\{C(\tau), D(\tau)\}$ and $\{C(\tau + n), D(\tau + n)\}$, respectively, the tap coefficients at the times $t = \tau + 1, \tau + 2, \ldots, \tau + n - 1$ are determined by the following formulae:

$$C(\tau + J) = \frac{(n - J)C(\tau) + J \cdot C(\tau + n)}{n} \quad (7)$$

$$D(\tau + J) = \frac{(n - J)D(\tau) + J \cdot D(\tau + n)}{n} \quad (8)$$

The increase in the number of operations by the interpolation can be ignored in comparison with the conventional adaptive tap coefficient updating algorithm, and the number of operations for executing the first order interpolation for the intermittent operation is reduced to around 1/n.

I claim:
1. An equalizer, comprising:

a) equalization means for equalizing an input signal, said equalization means including:
   weighting means for weighting components of said input signal by a set of tap coefficients;
b) first means for generating a set of tap coefficients which equalize a known signal sequence;
c) second means for intermittently generating a set of tap coefficients for equalizing the input signal sequence at intermittent intervals;
d) interpolation means for performing interpolation on consecutive sets of tap coefficients generated by said second means for generating a set of tap coefficients at a beginning and an end of at least one of the intermittent intervals to yield an interpolated set of tap coefficients;
e) means for selectively obtaining and applying one set of tap coefficients among a set of tap coefficients generated by said first means for generating tap coefficients, a set of tap coefficients generated by said second means for generating tap coefficients, or a set of tap coefficients generated by said interpolation means to said weighting means, wherein said means for selectively applying a set of tap coefficients initially applies tap coefficients from the first means for generating a set of tap coefficients to said weighting means, intermittently applies a set of tap coefficients from said second means for generating a set of tap coefficients to said weighting means and applies tap coefficients from said interpolation means to said weighting means between said intermittent intervals.

2. An equalizer as recited in claim 1 wherein said interpolation means performs first order interpolation.

3. An equalizer as recited in claim 1 wherein said first means for generating a set of tap coefficients comprises a processing means.

4. An equalizer as recited in claim 1 wherein said second means for generating a set of tap coefficients comprises a processing means.

5. An equalizer as recited in claim 1 wherein said means for selectively applying a set of tap coefficients comprises a switching means.

6. A method for equalizing an input signal in an equalizer having weighting means for weighting said input signal, comprising the steps of:

a) generating a set of tap coefficients appropriate for equalizing a known signal sequence;
b) applying the input signal to the equalizer wherein the tap coefficients generated in the generating step specify the weight applied by the weighting means of the equalizer;
c) intermittently updating the tap coefficients and applying said updated tap coefficients to the weighting means of said equalizer to better equalize the input signal; and
d) updating the tap coefficients by interpolation between said intermittent updating steps and applying said tap coefficients to said weighting means of said equalizer.

* * * * *

UNITED STATES PATENT AND TRADEMARK OFFICE
CERTIFICATE OF CORRECTION

PATENT NO. : 5,175,747

DATED : December 29, 1992

INVENTOR(S) : Keishi Murakami

It is certified that error appears in the above-identified patent and that said Letters Patent is hereby corrected as shown below:

Title page, item [30] Foreign Application Priority Data, insert--

Oct. 31, 1989 [JP] 285226/1989

Dec. 4, 1989 [JP] 315862/1989 --.

Signed and Sealed this

Twenty-sixth Day of April, 1994

Attest:

BRUCE LEHMAN

Attesting Officer

Commissioner of Patents and Trademarks